Nov. 10, 1970  M. P. O'MALLEY  3,538,577
METHOD FOR CONTROLLING TUBE HEIGHT BY TENSILE INFLATION
Filed June 9, 1969

INVENTOR
MICHAEL P. O'MALLEY
BY
ATTORNEY

United States Patent Office 3,538,577
Patented Nov. 10, 1970

3,538,577
METHOD FOR CONTROLLING TUBE HEIGHT BY TENSILE INFLATION
Michael P. O'Malley, Florissant, Mo., assignor to Olin Mathieson Chemical Corporation, a corporation of Virginia
Filed June 9, 1969, Ser. No. 831,520
Int. Cl. B21d 53/02
U.S. Cl. 29—157.3                4 Claims

ABSTRACT OF THE DISCLOSURE

The disclosure teaches providing an integrally unified, composite metal strip or sheet having an unbonded internal portion corresponding to a pattern of weld preventive material, applying a tensile force to said composite, and injecting a fluid into the unbonded portion under sufficient pressure to space apart the adjacent metal surfaces while the tensile force is applied to the composite.

---

A commonly used and efficient type of heat exchange unit for a variety of purposes is formed from a plurality of superimposed strips or sheets of metal having internally disposed therebetween one or more conduits or tubes to carry a heat exchange medium.

According to one known method of manufacture as illustrated in U.S. Pat. 2,690,002, this type of heat exchange unit may be readily manufactured to provide if desired a great multiplicity of tubes in a sheet or strip of metal. This method involves the application of a suitable predetermined pattern of weld inhibiting material between component sheets or strips and pressure welding all adjoining areas except those separated by the weld inhibiting material. This forms a unified composite panel. The panel is then inflated along the unwelded areas to erect tubes integral with the resultant tubed panel.

It is an object of the present invention to provide an improvement of the foregoing process.

It is a principal object of the present invention to provide an improvement which results in a superior product with a lessened tendency for the inflated strip to have wavy areas and camber.

It is a further object of the present invention to provide an improvement in processing which gives more uniform tube heights throughout the length and breadth of the strip.

Further objects and advantages of the present invention will appear from the ensuing specification.

In accordance with the present invention it has now been found that the foregoing objects and advantages may be readily attained. The process of the present invention comprises: providing an integrally unified composite metal strip having an unbonded internal portion corresponding to a pattern of weld preventive material; applying a tensile force to said strip; injecting a fluid, preferably air, into said unbonded portion under sufficient pressure to space apart the adjacent metal surfaces while said tensile force is applied to said strip. The tensile force is on the order of 40 to 110 p.s.i.

The present invention will be more readily apparent from a consideration of the drawings which form a part hereof in which.

Figure 1:
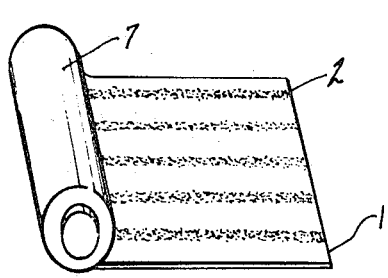
FIGS. 1 through 3 depict schematically a process for forming a blank from which an article of the present invention may be formed.
Figure 2:
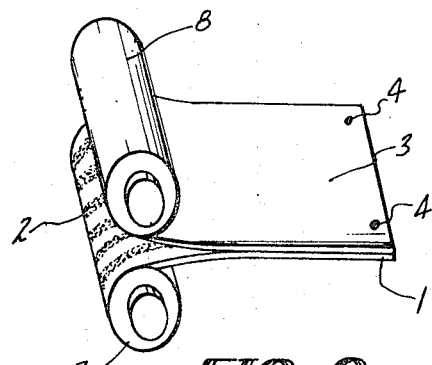
Figure 3:
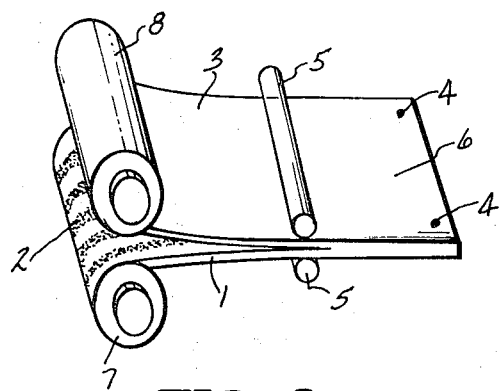
Figure 4:
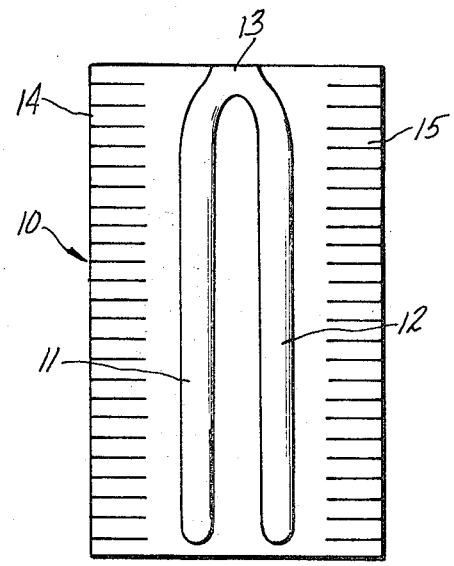
FIG. 4 is a top view of an alternative heat exchange component which may be fabricated by the process of the present invention.

Referring to the drawings, FIGS. 1–3 depict by way of example one method by which a strip-type heat exchanger having internal passageways may be produced. While the instant invention is applicable to any strip-type structure having internal passageways, the method of production disclosed in the aforementioned U.S. Pat. No. 2,690,002, is preferred. In accordance with such teachings, a first strip of material 1, payed off from a coil 7, may have applied to one face thereof any desired pattern of stop-weld material 2, as shown in FIG. 1. The stop-weld may be provided in the form of pattern, such as shown in FIG. 4, or one or more elongated passageways such as shown in FIG. 1.

A second strip of material 3, payed off from a coil 8, may then be superimposed upon the first strip 1, as shown in FIG. 2, and secured together as by spot welding 4 to prevent relative slippage of the adjacent surfaces of the strips 1 and 3 during a subsequent welding operation. The strips 1 and 3 may then be welded together throughout their contacting faces not separated by stop-weld material. For example, the superimposed strips may be treated by hot rolling as shown in FIG. 3. The superimposed strips are first heated and then passed through rolls 5 between which they are reduced in thickness and elongated in the direction of rolling. The resultant blank 6 having an unjoined inner portion corresponding to the pattern of stop-weld material 2 may then be softened in any appropriate manner as by annealing, and thereafter the blank may be cold rolled to provide a more even thickness and again annealed.

As is known in the art, such a method of producing a heat exchanger requires that a portion of the stop-weld material be adjacent an edge of the strip so that the internal passageway desired may be expanded by introduction of fluid pressure therethrough.

It should be emphasized that the foregoing stop-weld pattern is intended to be illustrative only and a wide variety of patterns may be readily employed as has been indicated hereinabove. Similarly, the fluid-distending pressure may be air pressure or water pressure although for reasons which may be apparent hereinafter air pressure is preferred.

Opposing sides of the above described heat exchanger may be of the same or different alloys. A wide variety of metals may be utilized as is known in the art, such as aluminum or aluminum alloys, copper or copper alloys, and so forth.

An alternative article which may be formed in accordance with the process of the present invention is article 10 shown in FIG. 4. Article 10 is formed in substantially the same manner as the article shown in FIGS. 1 through 3. After the inflation operation, the patterns of weld inhibiting material have resulted in corresponding tubular portions 11, 12 and 13. It should be understood that the merging of tubular portions 11 and 12 to provide inlet portion 13 is optional only. Naturally, many other configurations may be provided. Article 10 may be peripherally slit to form fins 14 and 15 for secondary heat exchange surface. Alternatively, an additional weld inhibiting pattern may be applied adjacent the passageway pattern reaching the marginal portions of the sheet. This will enable the attainment of twice as many fins in the resultant article.

Figure 5:
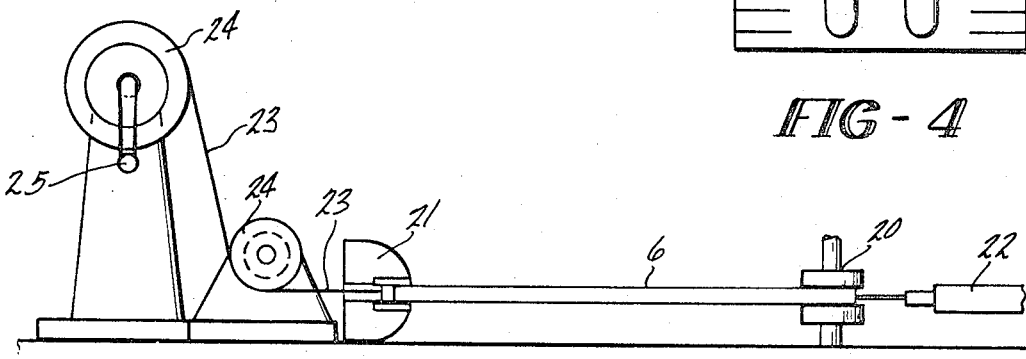
FIG. 5 represents a schematic view of the improved process of the present invention.

In accordance with the process of the present invention, as shown in FIG. 5, blank 6 is held firmly in place by means of clamp 20 and vise grip 21. The purpose of the clamp 20 and the vise grip 21 is to hold the blank firmly in place during the inflation process. Any desired holding means may be employed provided that they do not interfere with the expansion of the unbonded portion into passageways.

Fluid pressure inflation needle 22 is inserted into the portion of the stop-weld material adjacent the edge of the blank. The opposite end of blank 6 held by vise grip 21 is pulled in tension by any desired means such as that shown schematically in FIG. 5. In FIG. 5, the tension is applied through wire rope 23, pulleys 24 and crank mechanism 25.

The inflation needle is connected into a high pressure air system by any desired means, such as a hose and fitting arrangement known in the art. With the blank held in tension, air pressure between 2,000 and 2700 p.s.i. is forced into the uninflated strip. The tension is then gradually reduced allowing the tubes to obtain the desired tube height.

In acordance with the present invention, it is preferred to utilize air pressure. High pressure may be readily utilized in the process of the present invention. The exact level of pressure is dependent upon the particular composite under consideration.

It has been found in accordance with the present invention that the application of a tensile force to the end of the uninflated strip enables tube height control and prevents waviness or undulations in the resultant passageway. Freely inflated strip has a tendency to be wavy and has camber. Waviness causes non-parallel tube passes making the brazing or welding on of fins difficult. Camber is a cause for non-uniform part width, thus making fixturing of the finished unit a problem.

The present invention which utilizes inflation in tension, gives more uniform tube heights throughout the length and breadth of the strip. Higher than normal inflation pressures may readily be used to obtain tube heights normally attained at much lower inflation pressures. In addition, the process of the present invention is advantageous in that the high pressure used in the inflation can be much greater than normal burst pressure required in use specifications.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. The process which comprises: providing an integrally unified composite metal strip having an unbonded internal portion corresponding to a pattern of weld preventative material; applying a tensile force to said strip; injecting a fluid into said unbonded portion under sufficient pressure to space apart the adjacent metal surfaces to form at least one tubular passageway while said tensile force is applied to said sheet, and gradually reducing said tensile force while said fluid is being injected so as to obtain the desired tubular passageway height.

2. A process according to claim 1 wherein said tensile force is from 40 to 110 p.s.i.

3. A process according to claim 2 wherein said fluid is air under pressure of from 2000 to 2700 p.s.i.

4. A process according to claim 2 wherein said tensile force is applied by firmly holding one end of said sheet.

References Cited
UNITED STATES PATENTS

| | | | |
|---|---|---|---|
| 3,114,202 | 12/1963 | Werger | 29—157.3 X |
| 3,458,917 | 8/1969 | Mueller | 29—157.3 |
| 3,024,525 | 3/1962 | Wisberger | 29—421 |

JOHN F. CAMPBELL, Primary Examiner

D. C. REILEY, Assistant Examiner

U.S. Cl. X.R.

113—118